April 19, 1960　　　F. X. CASCONE　　　2,933,321
GUN DRILL HOLDER
Filed July 16, 1958　　　　　　　　　2 Sheets-Sheet 1
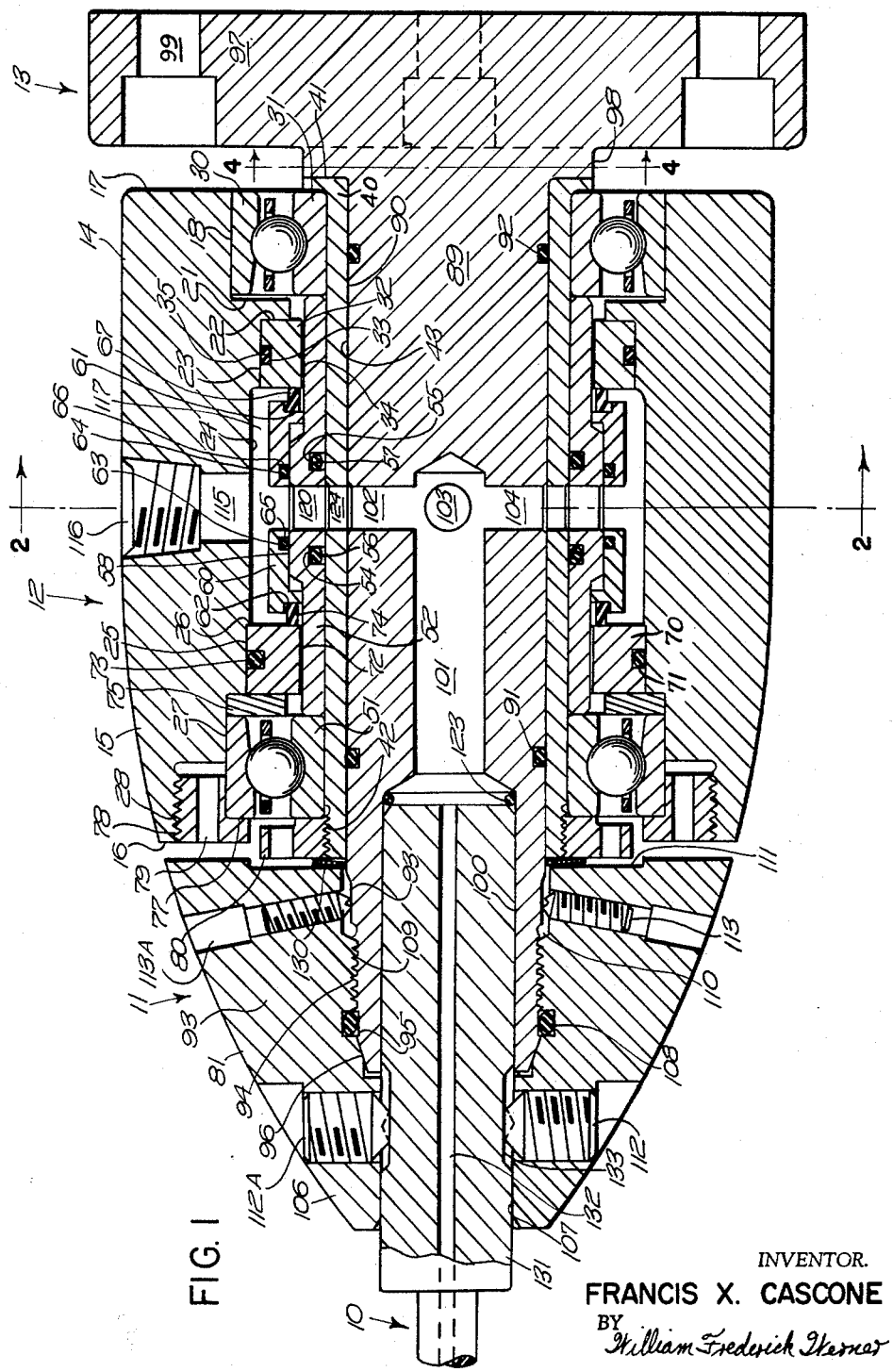
FIG. I
INVENTOR.
FRANCIS X. CASCONE
BY
William Frederick Werner
ATTORNEY

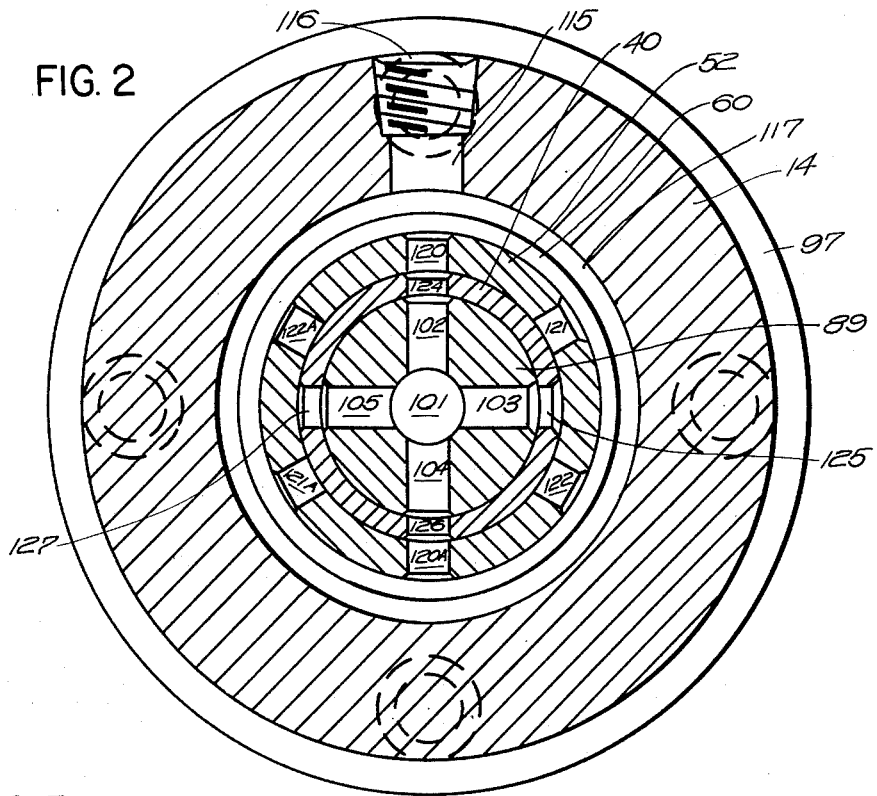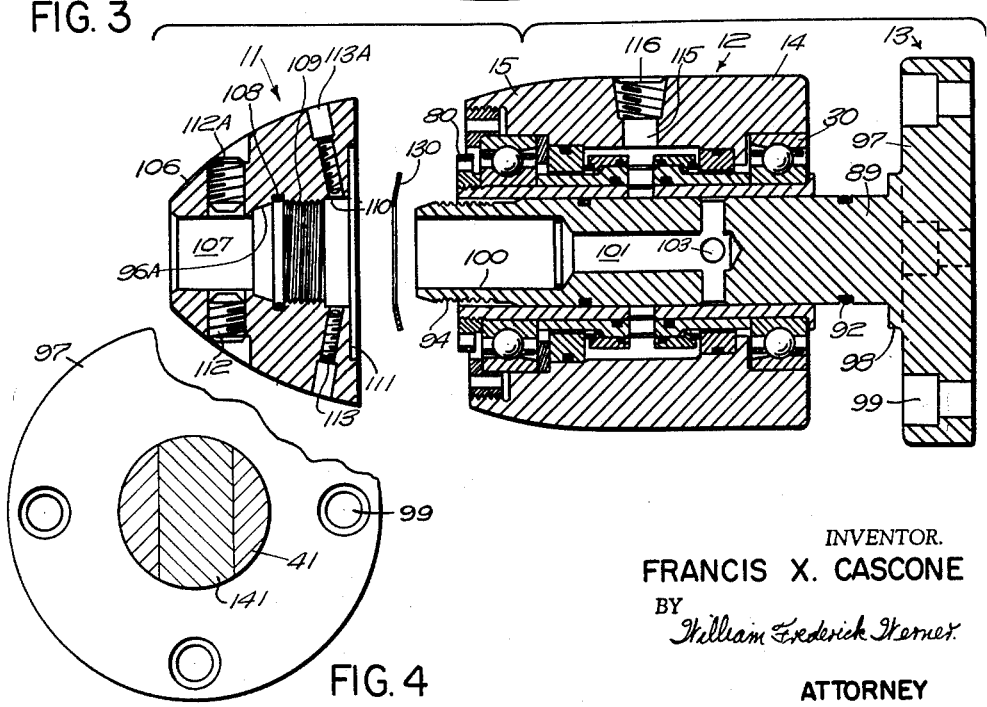

United States Patent Office 2,933,321
Patented Apr. 19, 1960

2,933,321

GUN DRILL HOLDER

Francis X. Cascone, Greenville, R.I., assignor of one-half to Americo S. Cardi, Cranston, R.I.

Application July 16, 1958, Serial No. 749,009

6 Claims. (Cl. 279—20)

The present invention relates to a gun drill holder and more particularly to a holder which may be interposed between a revolving spindle and a work piece to perform the operation of gun drilling.

One of the objects of the present invention is to provide a gun drill holder with a new, improved and novel construction.

Gun drilling is the process of drilling a precision hole with one cutting tool called a gun drill. It is accomplished by the type of drill and proper supply of coolant which also removes the chips during the drilling operation. A gun drill holder serves the function of a fluid transfer gland from a stationary source of fluid supply to a revolving tool holding member. Gun drilling eliminates the separate operations of drilling, reaming and honing. Since the conventional drill press or lathe lacks means to provide a coolant, a gun drill tool holder or adapter is provided which is attached to the revolving member of a drill press or lathe and which has means to provide a coolant fluid which also flushes the chips through the gun drill tool, the coolant fluid being supplied from a stationary source of supply.

The present invention is directed to a new and improved gun drill tool holder or adapter which supplies the coolant in a more efficient leak proof manner and with a new construction having as an object the ability to repair the holder or adapter during the tool cutting operation without disturbing the delicate tolerance relation between the driving member and the hole being cut.

In the past when a leak occurred in the gun drill holder during the tool cutting operation, the machine was stopped, the gun drill holder was removed, taken apart, repaired, reassembled and realigned. The realigning took from four hours to four days to reset the cutting tool in proper axial alignment with the hole being cut. The present invention completely eliminates realigning by providing a new construction for a tool holder which also eliminates the torque heretofore present in a gun drill holder.

Other objects of the present invention will be pointed out in part and become apparent in part in the following specification and claims.

Referring to the drawings in which similar characters of reference indicate corresponding parts in all the figures:

Figure 1 is a longitudinal medial cross sectional view through the new and improved gun drill holder.

Figure 2 is a transverse cross sectional view taken laong line 2—2 of Figure 1, looking in the direction of the arrows.

Figure 3 is an exploded view similar to Figure 1 showing the assembled units which unit is used to form the new and improved gun drill holder.

Figure 4 is a vertical cross sectional view taken along line 4—4 of Figure 1.

Referring to the drawings wherein reference characters 10, 11, 12 and 13 generally indicate the gun drill tool, the locking nose, the housing and the flanged shaft, respectively.

Housing 12 consists of a cylindrical body member 14 which may have a slightly tapered external shape on one end as at 15 and perpendicular front and rear ends 16, 17 respectively.

Axially, cylindrical body member 14 is provided with a cylindrical anti-friction bearing seat 18, a clearance diameter 20 which provides shoulder surfaces 21, 22, a magnetic fluid seal seat 23, a chamber wall 24, a second magnetic fluid seal seat 25 with an abutting wall 26 formed between said second magnetic fluid seal seat 25 and said chamber wall 24, a cylindrical anti-friction bearing seat 27 and a threaded area 28.

An anti-friction bearing having an outer race 30 and an inner race 31 is provided with the outer race 30 fixed in cylindrical bearing seat 18 as by means of a drive fit with clearance between said outer race 30 and said shoulder surface 21.

A magnetic fluid seal is provided consisting of a circular shaped permanent magnetic collar 32 having a fluid packing groove 33 and an axial clearance bore 34. Collar 32 is secured in magnetic fluid seal seat 23 with fluid tight packing such as an O ring 35 located in fluid packing groove 33 and engaging magnetic fluid seal seat 23 to form a fluid tight seal.

An auxiliary locking shaft 40 is provided externally with a shoulder 41 on one end and a threaded area 42 on the other end. Axially, auxiliary locking shaft 40 is provided with a shaft seat 43. Inner race 31 is secured to auxiliary locking shaft 40 as with a drive fit and abutting shoulder 41. A parallel sided groove 140 is provided in shoulder 41. A parallel sided projection 141 is provided on shoulder 98. Groove 140 is slidably engageable with projection 141 to form a key way drive.

An anti-friction bearing having an outer race 50 and an inner race 51 is provided with the outer race 50 fixed in cylindrical anti-friction bearing seat 27 as by means of a drive fit. Inner race 51 is fixed to auxiliary locking shaft 40 as by means of a drive fit.

A balance sleeve 52 is provided with a bore 53 which is slidingly mounted upon auxiliary locking shaft 40 with the opposite ends wedged between inner race 31 and inner race 51. Two fluid packing seal grooves 54, 55 are provided with fluid packing such as O-rings 56, 57 which engage auxiliary locking shaft 40 in fluid tight relationship. Balance sleeve 52 is provided externally with a seal carrying seat 58.

A steel ring 60 having carbon ring retaining seats 61, 62 in opposite ends is fixed to seal carrying seat 58 to rotate with it. Two fluid packing grooves 63, 64 are provided axially in steel ring 60 with fluid packing such as O-rings 65, 66 located in fluid packing grooves 63, 64 respectively, which engage seal carrying seat 58 in fluid tight relationship. A carbon ring 67 is fixed in carbon ring retaining seat 61 and rotatively engages permanent magnetic collar 32 to form a fluid tight rotating seal.

A second circular shaped permanent magnetic collar 70 having a fluid packing groove 71 and an axial clearance bore 72 is secured in magnetic fluid seal seat 25 with fluid tight packing such as an O-ring 73 located in groove 71 and engaging magnetic fluid seal seat 25 to form a fluid tight seal. A second carbon ring 74 is fixed in carbon ring retaining seat 62 and rotatively engages permanent magnetic collar 70 to form a fluid tight rotating seal. A spacing washer 75 is interposed between outer race 50 and second circular shaped permanent magnetic collar 70. An outer race securing collar 76 having an outer race abutment seat 77 and an external threaded diameter 78 is provided with seat 77 abutting outer race 50 to retain it in position when threaded diameter 78 is secured in threaded area 28. Spanner wrench orifices 79 are provided in collar 76 to rotate collar 76 for the engagement of threads 78 with threads 28.

An inner race securing collar 80 is provided with an axial threaded diameter which engages threaded area 42. Collar 80 provides pressure against inner race 51 and through the several ports to shoulder 41, to secure inner race 51, balance sleeve 52, inner race 31 and steel ring 60 in a rotating unit. Spanner wrench orifices 81 are provided in collar 80 to rotate collar 80 on threaded area 42.

The flanged shaft 13 consists externally of a shaft body 89 having a locking shaft seat 90 provided with fluid packing grooves 91, 92, a set screw seat 93, a threaded area 94, a fluid packing seat 95, a tapered nose 96, and a flange or face plate 97 having a shoulder 98. Face plate 97 is provided with bolt holes 99. Externally, flanged shaft 13 is provided with a tool receiving orifice 100 which terminates in an axial port 101 having four radial connections 102, 103, 104 and 105.

The locking nose 11 consists of an external tapered body 106 and axially of a gun drill tool receiving orifice 107, a fluid packing groove 108, a threaded area 109, a clearance diameter 110, a tapered seat 96A and an enlarged bore 111. Four set screw orifices are provided with set screws 112 and 113 and 112A and 113A. Set screws 112A and 113A are set 180 degrees or diametrically opposite set screws 112 and 113 respectively.

A coolant, lubricating and fluid flushing entering port 115 is provided in cylindrical body member 14. A threaded pipe connection 116 is provided in entering port 115. A chamber 117 is provided between chamber wall 24, steel ring 60, permanent magnetic collars 32, 70, first carbon ring 67 and second carbon ring 74. Six ports 120, 121, 122 and 120A, 121A, 122A are provided in balance sleeve 52 and are in communication with chamber 117. Four ports 124, 125, 126, 127 are provided in auxiliary locking shaft 40 and are in communication with at least two of the ports 120, 121, 122, 120A, 121A, 122A, and are respectively aligned with ports 102, 103, 104, 105 so that fluid entering port 115 has passage to axial port 101 and is confined by the respective O rings and carbon rings as previously and illustrated in Figure 1.

Referring to Figure 3 wherein is illustrated one of the principal objects of the present invention, namely a three part unit which produces new and unique results.

Face plate 97 through the medium of bolt holes 99 is fastened to the rotating element of a machine tool. Through the medium of locking shaft seat 90, flange shaft 13 is dial indicated into precision alignment with the center of the spot in the work piece where the gun drill tool is to cut. Thus, face plate 97 is precision aligned with the center line of the hole to be cut or drilled. This is an important new result achieved through the present construction because the housing 12, containing the elements such as fluid packing and frictionless bearings which need frequent repair and replacement, is a compact, self-contained unit, which is interchangeable with flange shaft 13 and independent of the axial alignment of the flange shaft 13 with the hole being drilled. Thus, during the tool cutting operation, should a leak occur, housing 12 may be removed, repaired and replaced without disturbing the precision setting or alignment of the flanged shaft 13. Costly resetting or realigning time is saved.

Housing 12 is a self contained unit because auxiliary locking shaft 40 through shoulder 41 and securing collar 80 supports the rotatable elements of the inner races 31, 51, balance sleeve 52, steel ring 60 and carbon rings 67, 74 and the non-rotating elements of the outer races 30, 50 spacing washer 75, securing collar 76, magnetic collars 32, 70 and body member 14.

The torque created by the rotating friction of the balls in the anti-friction bearings and the carbon rings is negligible. For practical purposes there is an absence of rotating torque. This is another object and feature of the present construction.

Housing 12 slides upon shaft body 89 with shaft seat 43 engaging locking shaft seat 90 and fluid packing in grooves 91, 92 providing a fluid tight seal. Shoulder 41 abuts shoulder 98.

A washer 130 is mounted on locking shaft seat 90 abutting securing collar 80. Locking nose 11 is secured to shaft body 89 through threaded areas 94 and 109 with the base of the enlarged bore 111 abutting washer 130. The fluid packing in fluid packing groove 108 engaging fluid packing seat 95 provides a fluid tight seal. Set screws 113 and 113A fasten locking nose 11 to shaft body 89.

A gun drill type tool generally indicated by reference character 10 of which the shank 131 is illustrated partly in cross section in Figure 1, is provided with an axial fluid passageway 132 and an external retaining seat 133. Shank 131 is located in tool receiving orifice 100 with the end of said shank engaging an O-ring packing washer 123 to provide a fluid tight engagement of shank 131 with tool receiving orifice 100. Set screws 112, 112A engaging seat 133 secure shank 131 to locking nose 11.

The companion tapers 96, 96A on the end of the shaft body 89 and the axial passageway of the locking nose 11 axially align the locking nose with the locking shaft thereby aligning the respective tool orifices 107, 100.

It will be noted that the locking nose 11 may be removed from the flanged shaft 13. The cutting tool is secured in locking nose 11. The tool is therefore removed from the shaft body 89 and replaced in the shaft body without disturbing the axial alignment of the tool with the flanged shaft 13.

Having shown and described a preferred embodiment of the present invention, by way of example, it should be realized that structural changes could be made and other examples given without departing from either the spirit or scope of this invention.

What I claim is:

1. A gun drill holder consisting of a flanged shaft, means to align in precision and secure said flanged shaft to the rotating element of a machine tool, a body member comprising a rotating and a non-rotating element, said rotating element removably secured to said flanged shaft, a locking nose, having an axial tapered seat, removably secured to said flanged shaft, a tapered nose on said flanged shaft, a tool receiving orifice in said flanged shaft and locking nose, means in said locking nose to removably secure said locking nose to said flanged shaft, said tapered seat and tapered nose co-operating to axially align said locking nose on said flanged shaft and means in said body member and flanged shaft to provide fluid to said tool receiving orifice.

2. A gun drill holder consisting of a flanged shaft having a shaft body projecting from a face plate, a tool receiving orifice axially provided in said shaft body, a plurality of ports in said shaft body in communication with said tool receiving orifice, said shaft body and face plate adapted to be aligned and secured to a rotating element of a machine tool, a body member comprising an outer non-rotating housing and an inner rotatable sleeve, two anti-friction bearings rotatively mounting said outer non-rotating housing to said inner rotatable sleeve, said inner rotatable sleeve removably secured to said shaft body to rotate with said shaft body, two magnetic fluid seals comprising rotating and non-rotating elements, said non-rotating elements secured to said outer non-rotating housing, said rotating elements secured to said inner rotatable sleeve, a chamber defined between said outer non-rotating housing, inner rotatable sleeve and between said two magnetic fluid seals, said outer-nonrotating housing and said inner rotatable sleeve with said two magnetic fluid seals and said two anti-friction bearings constituting a unit removably secured to said shaft body through said inner rotatable sleeve, a port in said outer non-rotating housing in communication with said chamber, and a plurality of ports in said inner rotatable sleeve in communication with said chamber and with the plurality of ports in said shaft body for conducting fluid from an external source to said tool receiving orifice during rotation of said inner rotatable sleeve by said flanged shaft.

3. A gun drill holder consisting of a flanged shaft having a shaft body projecting from a face plate, a tool receiving orifice axially provided in said shaft body, a plurality of ports in said shaft body in communication with said tool receiving orifice, said shaft body and face plate adapted to be aligned and secured to a rotating element of a machine tool to be rotated thereby, a body member comprising an outer non-rotating housing and an inner rotatable sleeve, said inner rotatable sleeve removably secured to said shaft body to be rotated thereby, two anti-friction bearings rotatively mounting said outer non-rotating housing to said inner rotatable sleeve, two fluid seals comprising rotating and non-rotating elements, said non-rotating elements secured to said outer non-rotating housing, said rotating elements secured to said inner rotatable sleeve, a chamber defined between said outer non-rotating housing and said inner rotatable sleeve, and between said two fluid seals, said outer rotating housing and said inner rotatable sleeve with said two fluid seals and said two anti-friction bearings constituting a unit removably secured to said shaft body, a port in said outer non-rotating housing in communication with said chamber, a plurality of ports in said inner rotatable sleeve in registry with said chamber and with the plurality of ports, in said shaft body for conducting fluid from an external source to said port in said outer non-rotatable element and to said tool receiving orifice during rotation of said inner rotatable sleeve and said shaft body, a shoulder on said inner rotatable sleeve, a securing collar rotatively mounted to said inner rotatable sleeve, said shoulder and said securing collar cooperating to retain said outer non-rotating housing to said inner rotatable sleeve, a locking nose removably secured to the end of said shaft body in fluid tight relationship and means in said locking nose in registry with said tool receiving orifice to receive and hold a rotating cutting tool.

4. A gun drill holder consisting of a flanged shaft having a shaft body projecting from a face plate, a tapered end on said shaft body, a tool receiving orifice axially provided in said shaft body, a plurality of ports in said shaft body in communication with said tool receiving orifice, said shaft body and face plate adapted to be aligned and secured to a rotating element of a machine tool to be rotated thereby, a body member comprising an outer non-rotating housing and an inner rotatable sleeve, having a plurality of ports in registry with the plurality of ports in said shaft body, means to removably secure said inner rotatable sleeve to said shaft body, in fluid tight relation to be rotated thereby, two units, each comprising a fluid tight rotary seal and an anti-friction bearing, each unit having rotating and non-rotating elements, the rotating elements being fixed to said inner rotatable sleeve, in fluid tight relation the non-rotating elements being fixed to said outer non-rotating housing, in fluid tight relation a balancing sleeve provided with a plurality of ports secured in fluid tight relation to said inner rotatable sleeve and interposed between said two units with some of said plurality of ports in registry with said plurality of ports in said sleeve, said two units defining a fluid tight chamber between themselves and the inner rotatable sleeve and outer non-rotating housing, said two units, said balancing sleeve, said outer non-rotating housing and said inner rotating sleeve constituting an assembled mechanical unit slidingly engageable to and from said shaft body, a port in said outer non-rotating housing in communication with said chamber, said plurality of ports in said balancing sleeve in registry with said chamber for conducting fluid from an external source to said port in said outer non-rotatable housing and to said tool receiving orifice during rotation of said shaft body, a securing collar removably secured to said inner rotatable sleeve to retain said outer non-rotating housing to said inner rotatable sleeve, a locking nose axially having a tool receiving orifice and a tapered surface, means to removably attach in fluid tight relation said locking nose to said shaft body with said tapered surface engaging said tapered end to axially align said locking nose on said shaft body with the tool receiving orifice in said locking nose in alignment with the tool receiving orifice in said shaft body and means in said locking nose to removably attach a gun drill tool in said tool receiving orifices.

5. A claim as defined in claim 4 being further characterized in that: a washer is mounted upon said shaft body and between said locking nose and said securing collar to cause said locking nose to abut said securing collar through said washer to lock said securing collar on said inner rotatable sleeve.

6. A gun drill holder consisting of a flanged shaft comprising a face plate, a shaft body integrally formed in said face plate and having on its outer end a beveled face, a fluid packing seat adjacent said beveled face and a threaded area adjacent said fluid packing seat, a housing consisting of a body member and provided axially with a first anti-friction bearing seat, a first shoulder surface, a first magnetic fluid seal seat, a chamber wall, a second magnetic fluid seal seat, an abutting wall, a second anti-friction bearing seat and a first threaded area, a first anti-friction bearing comprising an outer race and an inner race, said outer race secured in said first anti-friction bearing seat, a first magnetic fluid seal comprising a permanent magnetic collar, a steel ring and a carbon ring fixed in said steel ring and rotatively engaging said permanent magnetic collar, said first permanent magnetic collar secured in said first magnetic fluid seal seat abutting said first shoulder surface in fluid tight relationship, a second magnetic fluid seal comprising a permanent magnetic collar, a steel ring and a carbon ring fixed in said steel ring and rotatively engaging said permanent magnetic collar, said second permanent magnetic collar secured in said second magnetic fluid seat in fluid tight relationship, a chamber formed by said chamber wall and said first and second magnetic fluid seals, a port in said body member in communication with said chamber and pipe connecting means provided in said port, a second anti-friction bearing comprising an outer race and an inner race, said outer race secured in said second anti-friction bearing seat, a washer interposed between said second permanent magnetic collar and said outer race, an outer race securing collar secured in said second threaded area to retain the non-rotating elements of said second outer race, washer and said second permanent magnetic collar in position, an auxiliary locking shaft provided with a second mentioned shoulder on one end and a third mentioned threaded area on the other end, a balance sleeve provided medially with a port and two steel ring seats located on opposite sides of said port secured to said auxiliary locking shaft with said first inner race interposed between one end of said balance sleeve and said second mentioned shoulder and said second inner race abutting the other end of said balance sleeve, an inner race securing collar secured to said third mentioned threaded area, abutting said second inner race to retain the rotating elements of said first inner race, said balance sleeve said first and second steel rings secured to said two steel ring seats, and said second inner race to said auxiliary locking shaft and through said first and second anti-friction bearing providing a self contained unit of body member, first and second anti-friction bearings, first and second magnetic seals, auxiliary locking shaft, balance sleeve, outer race securing collar and inner race securing collar, said auxiliary locking shaft slidably engaging said shaft body, a locking nose axially having a tool receiving orifice, a beveled face, a fluid packing groove, and a threaded area, a second washer located on said auxiliary locking shaft, said locking nose engaging said first mentioned threaded area with said fourth mentioned threaded area to removably secure said locking nose to said shaft body and retain said inner race securing collar on said auxiliary locking shaft with said second washer interposed between said locking nose and inner race securing collar and with fluid packing in said last mentioned fluid packing groove and the fluid packing seat in said shaft body, the beveled face in said shaft body seating against the beveled face in said locking nose, to axially align said locking nose with said shaft body and means in said locking nose to removably secure said locking nose to a cutting tool located in said tool receiving orifice and a second means in said locking nose to removably secure said locking nose to said shaft body, whereby through said second means said locking nose may be removed from said shaft body without disturbing the axial alignment of said locking nose with said shaft body.

References Cited in the file of this patent

UNITED STATES PATENTS

| | | |
|---|---|---|
| 1,028,623 | Smith | June 4, 1912 |
| 1,760,354 | Gartin | May 27, 1930 |
| 2,552,463 | Searles | May 8, 1951 |
| 2,772,897 | Shaw et al. | Dec. 4, 1956 |
| 2,777,702 | Rodal | Jan. 15, 1957 |